(12) United States Patent
Dorner

(10) Patent No.: US 9,619,519 B1
(45) Date of Patent: Apr. 11, 2017

(54) DETERMINING USER INTEREST FROM NON-EXPLICIT CUES

(71) Applicant: Amazon Technologies, Inc., Reno, NV (US)

(72) Inventor: Charles Shearer Dorner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 14/312,328

(22) Filed: Jun. 23, 2014

(51) Int. Cl.
*G06F 17/30* (2006.01)

(52) U.S. Cl.
CPC .. *G06F 17/30522* (2013.01); *G06F 17/30126* (2013.01)

(58) Field of Classification Search
None
See application file for complete search history.

(56) References Cited

U.S. PATENT DOCUMENTS

| | | | |
|---|---|---|---|
| 6,947,922 B1* | 9/2005 | Glance | G06F 17/30017 705/26.1 |
| 2005/0243054 A1* | 11/2005 | Beymer | A61B 3/0033 345/156 |

OTHER PUBLICATIONS

Maglio et al., "Suitor: An Attentive Information System", IUI 2000, pp. 169-176, ACM 2000.*
Schmidt, "Implicit human computer interaction through context", Personal Technologies, vol. 4, Issue 2, pp. 191-219, 2000, Springer-Verlag.*
Seo et al., "Learning User's Preferences by Analyzing Web-Browsing Behaviors", Agents 2000, pp. 381-387, 2000, ACM.*

* cited by examiner

*Primary Examiner* — Bai D. Vu
(74) *Attorney, Agent, or Firm* — Knobbe, Martens, Olson & Bear, LLP

(57) ABSTRACT

Systems and methods are provided for detecting non-explicit cues based on user interactions with a user interface. For example, user interest with respect to items may be determined based on indirect user interaction with a user interface. Furthermore, two or more non-explicit cues determined to be associated with a particular item may indicate a strong likelihood of user interest. One or more additional displays of information may be presented to the user in response to the detected one or more non-explicit cues, for example, by displaying additional information regarding an item and/or displaying an element to teach a user about the user interface.

21 Claims, 8 Drawing Sheets

602A

| Element 1 - 5 | Element 2 - 5 | Element 3 - 5 |
|---|---|---|
| Element 4 - 5 | Element 5 - 5 | Element 6 - 5 |
| Element 7 - 5 | Element 8 - 5 | Element 9 - 5 |
| Element 10 - 5 | Element 11 - 5 | Element 12 - 5 |
| Element 13 - 5 | Element 14 - 5 | Element 15 - 5 |
| Element 16 - 5 | Element 17 - 5 | Element 18 - 5 |
| Element 19 - 5 | Element 20 - 5 | Element 21 - 5 |
| Element 22 - 5 | Element 23 - 5 | Element 24 - 5 |
| Element 25 - 0 | Element 26 - 0 | Element 27 - 0 |
| Element 28 - 0 | Element 29 - 0 | Element 30 - 0 |
| Element 31 - 5 | Element 32 - 5 | Element 33 - 5 |
| Element 34 - 5 | Element 35 - 5 | Element 36 - 5 |
| Element 35 - 5 | Element 38 - 5 | Element 39 - 5 |
| Element 36 - 5 | Element 41 - 5 | Element 42 - 5 |
| Element 37 - 5 | Element 44 - 5 | Element 45 - 5 |

| Element 1 - 10 | Element 2 - 15 | Element 3 - 30 |
|---|---|---|
| Element 4 - 10 | Element 5 - 15 | Element 6 - 15 |
| Element 7 - 10 | Element 8 - 10 | Element 9 - 10 |
| Element 10 - 5 | Element 11 - 5 | Element 12 - 5 |
| Element 13 - 5 | Element 14 - 5 | Element 15 - 5 |
| Element 16 - 5 | Element 17 - 5 | Element 18 - 5 |
| Element 19 - 5 | Element 20 - 5 | Element 21 - 5 |
| Element 22 - 1 | Element 23 - 1 | Element 24 - 1 |
| Element 25 - 0 | Element 26 - 0 | Element 27 - 0 |
| Element 28 - 0 | Element 29 - 0 | Element 30 - 0 |
| Element 31 - 5 | Element 32 - 5 | Element 33 - 5 |
| Element 34 - 5 | Element 35 - 5 | Element 36 - 5 |
| Element 35 - 5 | Element 38 - 5 | Element 39 - 5 |
| Element 36 - 5 | Element 41 - 5 | Element 42 - 5 |
| Element 37 - 35 | Element 44 - 35 | Element 45 - 35 |

FIG. 6B

DETERMINING USER INTEREST FROM NON-EXPLICIT CUES

BACKGROUND

Retailers and merchants involved in electronic commerce often provide user interfaces for a user to receive information regarding items (e.g., products and/or services) available for purchase and/or allow a user to browse items included in an electronic catalog. Often, information is presented to users regarding items based on explicit cues. For example, a user may enter a term or keyword of interest to the user, and then be presented with search results. Alternatively, a user may choose to browse items in a selected category or collection. A user may also select an item of interest and then the user may be provided recommendations and/or other items based on the explicitly selected item of interest. In some user interfaces, additional information regarding an item may be displayed based on hover over interactions by which a user moves a cursor location to intersect with a displayed location of an item and/or an image of the item.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIGS. 6A-B illustrate an example probability and/or weighting map of elements based at least in part on analysis of non-explicit cues.

DETAILED DESCRIPTION

Figure 1A:
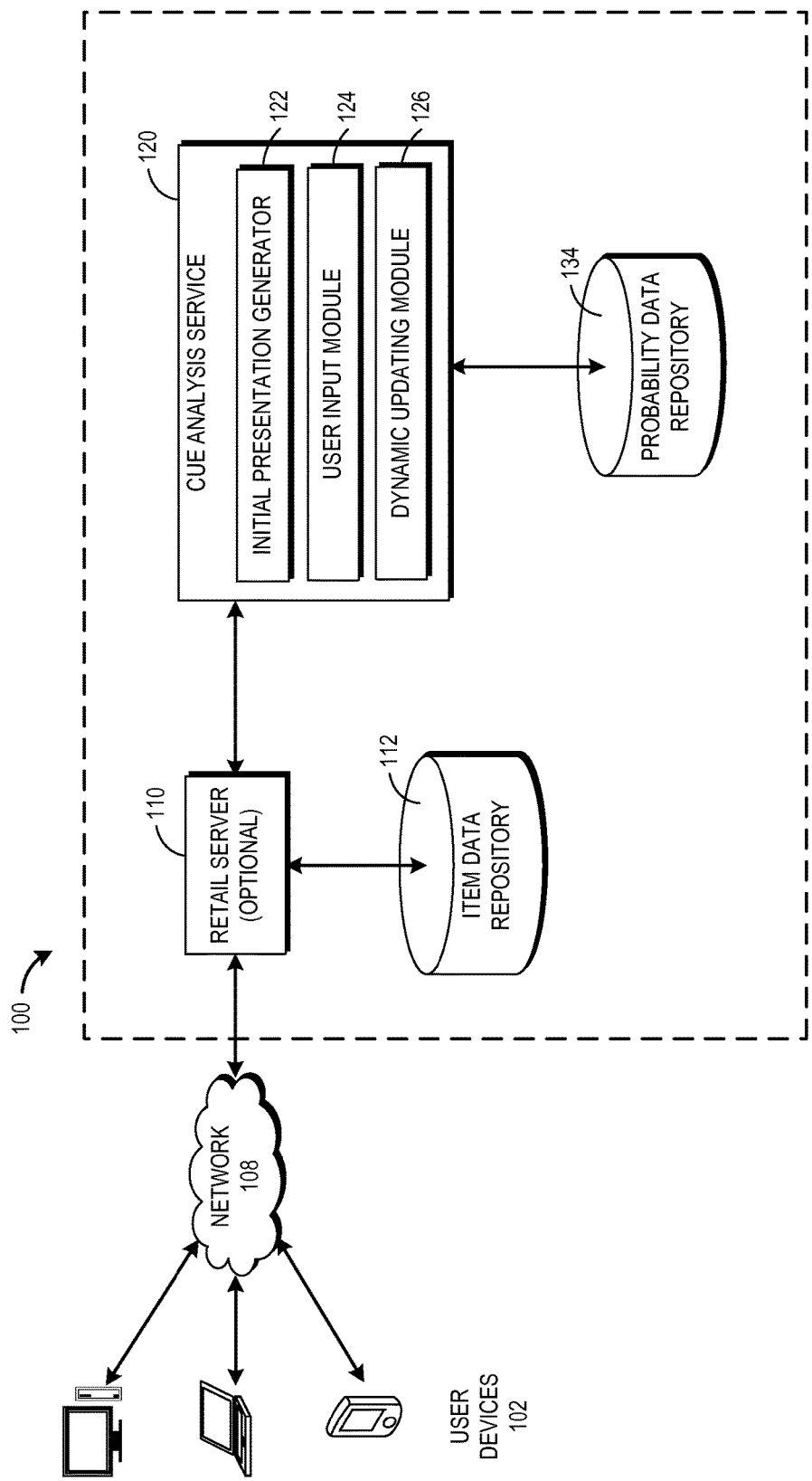
FIG. 1A is a block diagram depicting an illustrative operating environment for determining the likelihood of user interest based on non-explicit cues.

Due to the ever-increasing amount of information available to users of electronic catalog services and other network services, there is an ongoing need to efficiently and/or dynamically display relevant and/or useful information to users based on minimal user interaction. User interfaces often present multiple items, for example, collections of items returned in response to a search or browse request of an electronic catalog, or items grouped together in a collection based on category, context, content, or other factors. However, such collections may contain large quantities of items and, therefore, the collection may be overwhelming and/or unmanageable for a user to quickly narrow and/or find items of interest to the user. According to aspects of the present disclosure, user interactions and/or non-explicit cues may be analyzed to determine items of likely interest to a user and/or to present additional information to the user based on the one or more determined items of likely interest. Thus, users may receive relevant and/or customized information based on minimal and/or indirect user interactions.

Generally described, aspects of the present disclosure relate to receiving and/or determining non-explicit cues associated with user interface elements and/or updating a presentation based on an analysis of those non-explicit cues. For example, according to some embodiments, when a user interface or page is generated, as described herein, content may be selected to present in the user interface. The content may include item information and/or item images that are each associated with a corresponding item. User interaction with the user interface may include non-explicit cues that are not directly associated with a particular item, such as scrolling behavior, pauses and/or gaps in user interaction, eye detection, device movement, magnification, screen brightness changes and/or others. For example, a user may interact with the user interface by scrolling past some items and then scrolling back to those items, which may indicate user interest in those items either on its own or when combined with other non-explicit cues, depending on the embodiment. In some embodiments, user interest may be determined based on a probability and/or weighting map that tallies the likelihood of user interest on an element-by-element basis. In response to a determination of likely user interest, additional user interface elements and/or information may be displayed to the user.

As used herein, the term "non-explicit cue," in addition to having its ordinary meaning, may refer to any user input or other data derived from user interaction that does not explicitly indicate user interest in a specific item or element of a user interface, but which may suggest that a user is interested in one or more elements or items previously or presently displayed to the user. A non-explicit cue may not be directed exclusively and/or specifically to a single item and/or element. In other words, a non-explicit cue may relate to the presentation as a whole and/or multiple items. Examples of explicit cues from a user include direct selection of an item and/or item image, textual input to search for items, hover over a particular item and/or item image, or the like. As will be described below with reference to FIGS. 3A, 4A-C and 5, non-limiting examples of non-explicit cues may include browsing of items such as scrolling through multiple items, magnification of a display with respect to a subset of the items, and/or user eye focus on a particular region of the user interface corresponding to a subset of the items. Also, as used herein, the terms "user interface element" and/or "element" may include information regarding an item, such as products presented to a user in an electronic commerce context, and/or anything presented to a user in a user interface, such as icons, animations, images, selectors, text, or the like.

In some embodiments, an electronic catalog system, as described herein, may include or be in communication with an electronic data store of information about items that may be listed for sale, lease, etc. by sellers, merchants and/or other users. The item information in this data store may be viewable by end users through a browsable or searchable electronic catalog in which each item may be described in association with a network page describing the item (which may be referred to herein as an item detail page). Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree and/or using various other navigation techniques. As used herein, the term "item," in addition to having its ordinary meaning, is used interchangeably to refer to an item itself (e.g., a particular product or service) and to its description or representation in a computer system or electronic catalog. As will be apparent from the context in which it is used, the term is also sometimes used herein to refer only to the item itself or only to its representation in the computer system.

While a retail environment is often used as an example below, it will be appreciated that non-explicit cues, as disclosed herein, may be used and/or processed in a variety of environments other than a retail environment. For example, aspects of the present disclosure, in some embodiments, may be used and/or implemented to identify non-explicit cues within any user interface, page, video, electronic book and/or other electronic content. Without limitation, aspects of the present disclosure may be used for non-explicit cue identification in social networking contexts (including electronic dating), advertising contexts, video gaming contexts, editorial content, digital news articles, and/or other types of contexts. For example, in a social networking context, some users may be apprehensive about explicitly selecting other users and/or elements associated with those other users because such selection may result in direct communication with those other users. Thus, non-explicit cues may be used in the social networking context to enhance the user experience by analyzing indirect user interactions and/or providing additional information based on the non-explicit cues.

The illustrative operating environment shown in FIG. 1A includes an electronic marketplace system 100 that enables users to browse and place orders for items (such as items listed in an electronic catalog). The marketplace system 100 may include one or more cue analysis services 120 that include an initial presentation generator 122, a user input module 124, and a dynamic updating module 126 stored in memory therein that may be used to implement various aspects of the present disclosure, such as presenting items, analyzing various non-explicit cues with respect to those items and/or elements, assigning weights to items and/or elements based on the non-explicit cues, dynamically updating content based on the non-explicit cues, and other aspects discussed herein. The marketplace system 100 may also include one or more retail servers 110 that facilitate electronic browsing and purchasing of items, such as goods and/or services, using various user devices, such as user computing devices 102. Those skilled in the art will recognize that the user computing devices 102 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

The retail server 110 may be connected to and/or in communication with an item data repository 112 that stores item information, metadata, and/or attributes regarding a number of items, such as items listed in an electronic catalog as available for browse and/or purchase via the retail server 110. Item data stored in item data repository 112 may include any information related to each item. For example, item data may include, but is not limited to, price, availability, title, item identifier, item images, item description, item attributes, keywords associated with the item, etc. In some embodiments, the item data repository 112 may store digital content items (e.g., audiobooks, electronic books, music, movies, multimedia works, etc.). The retail server 110 may also be connected to or in communication with a user data store (not illustrated) that stores user data associated with users of retail server 110, such as account information, purchase history, browsing history, item reviews and ratings, personal information, user preferences, location information, etc. The cue analysis service 120 may be connected to and/or in communication with an image data repository (not illustrated) that may be used to store one or more images associated with each of the number of items that can be displayed. In some embodiments, images associated with items may be stored in the item data repository 112. Multiple images can be associated with an item, for instance to aid a user in a purchase decision regarding the item by showing additional views and/or perspectives of the item.

The cue analysis service 120 may be connected to and/or in communication with a probability data repository 134 that stores data related to non-explicit cues. For example, probability data repository 134 may store one or more probability maps, probability data, rules associated with determining probabilities and/or scores, and/or data regarding patterns of user input related to non-explicit cues, which are described in further detail below.

In some embodiments, each of item data repository 112 and/or probability data repository 134 may be local to cue analysis service 120, may be local to retail server 110, may be remote from both cue analysis service 120 and retail server 110, and/or may be a network-based service itself. The item data repository 112 and/or probability data repository 134 may be embodied in hard disk drives, solid state memories, and/or in any other type of non-transitory computer-readable storage medium, and/or may be stored as a file, a database, a relational database, and/or in-memory cache, in any such non-transitory computer-readable medium accessible to the retail server 110. The item data repository 112 and/or probability data repository 134 may also be distributed or partitioned across multiple local and/or remote storage devices without departing from the spirit and scope of the present disclosure.

In the environment shown in FIG. 1, a user of the marketplace system 100 may utilize a user computing device 102 to communicate with the retail server 110 via a communication network 108, such as the Internet or other communications link. The network 108 may be any wired network, wireless network or combination thereof. In addition, the network 108 may be a personal area network, local area network, wide area network, over-the-air broadcast network (e.g., for radio or television), cable network, satellite network, cellular telephone network, or combination thereof. For example, the network 108 may be a publicly accessible network of linked networks, possibly operated by various distinct parties, such as the Internet. In some embodiments, the network 108 may be a private or semi-private network, such as a corporate or university intranet. The network 108 may include one or more wireless networks, such as a Global System for Mobile Communications (GSM) network, a Code Division Multiple Access (CDMA) network, a Long Term Evolution (LTE) network, or some other type of wireless network. The network 108 can use protocols and components for communicating via the Internet or any of the other aforementioned types of networks. Protocols and components for communicating via the Internet or any of the other aforementioned types of communication networks are well known to those skilled in the art and, thus, are not described in more detail herein.

The marketplace system 100 is depicted in FIG. 1A as operating in a distributed computing environment including several computer systems that are interconnected using one or more computer networks. The marketplace system 100 could also operate within a computing environment having a fewer or greater number of devices than are illustrated in FIG. 1A. Thus, the depiction of marketplace system 100 in FIG. 1A should be taken as illustrative and not limiting to the present disclosure. For example, the marketplace system 100 or various constituents thereof could implement various Web services components, hosted or "cloud" computing environments, and/or peer-to-peer network configurations to implement at least a portion of the processes described herein.

In brief, the retail server 110 is generally responsible for providing front-end communication with various user devices, such as a user computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores, such as item data repository 112, as is done in conventional electronic commerce systems. In certain embodiments, the retail server 110 may also access item data from other data sources, either internal or external to marketplace system 100. While marketplace system 100 is often described herein with respect to an embodiment in which the cue analysis service 120 communicates with a retail server 110 in a retail environment, in other embodiments, a cue analysis service 120 may operate independently of a retail environment. In some such embodiments, the cue analysis service 120 may communicate with a user computing device 102 without the presence of a retail server, or may communicate with another server responsible for providing front-end communication with the computing device 102. In other embodiments, the retail server 110 may include or implement a cue analysis service 120, as described herein, such that a separate cue analysis service 120 may not be present in certain embodiments.

Figure 1B:
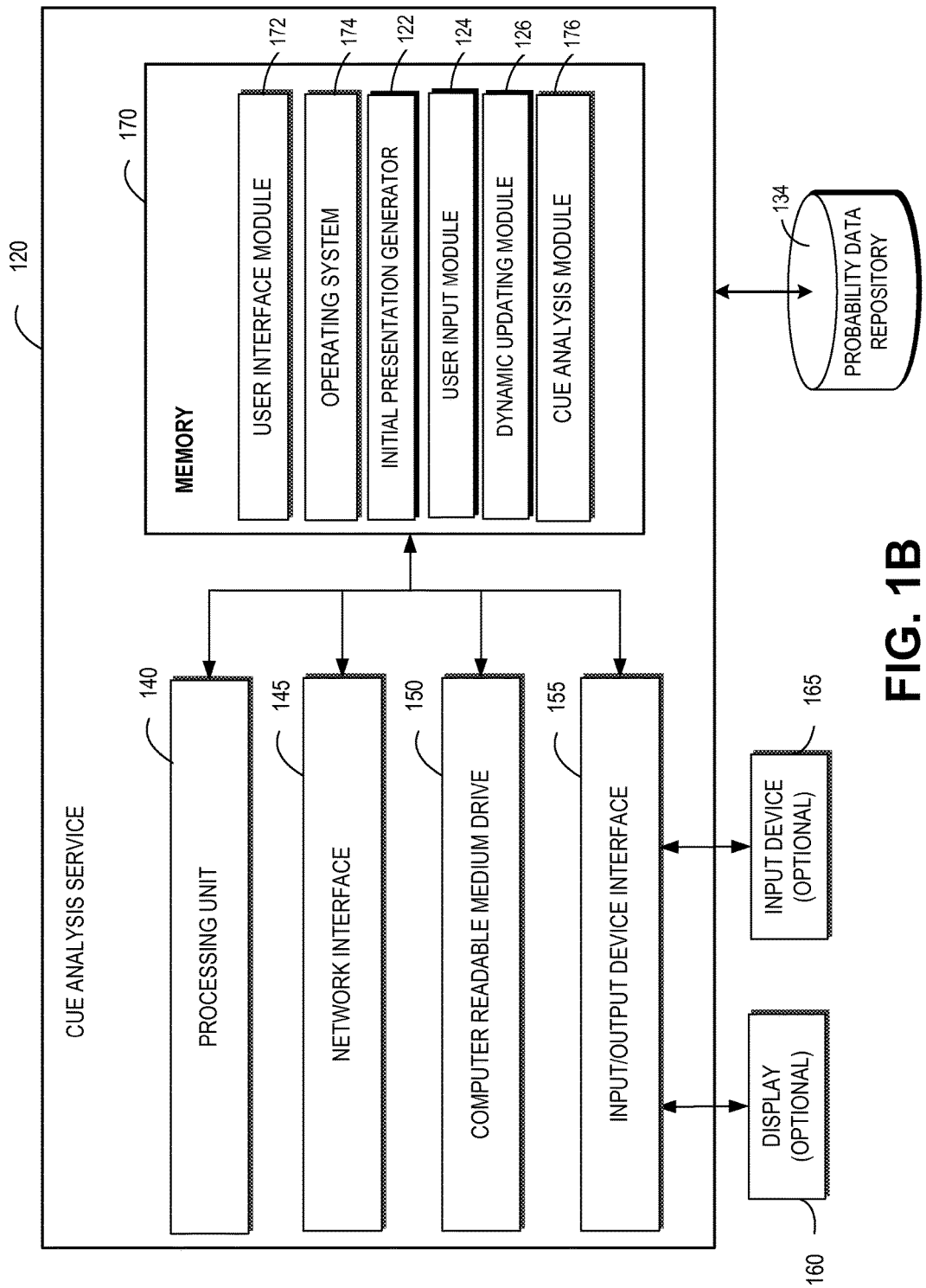
FIG. 1B depicts a general architecture of a computing device providing a cue analysis service for determining the likelihood of user interest based on non-explicit cues.

FIG. 1B depicts a general architecture of a computing system (referenced as cue analysis service 120) that processes non-explicit cues and/or updates at least a portion of a user interface based on analyses of the non-explicit cues. The general architecture of the cue analysis service 120 depicted in FIG. 1B includes an arrangement of computer hardware and software modules that may be used to implement aspects of the present disclosure. The cue analysis service 120 may include many more (or fewer) elements than those shown in FIG. 1B. It is not necessary, however, that all of these generally conventional elements be shown in order to provide an enabling disclosure. As illustrated, the cue analysis service 120 includes a processing unit 140, a network interface 145, a computer readable medium drive 150, an input/output device interface 155, a display 160, and an input device 165, all of which may communicate with one another by way of a communication bus. The network interface 145 may provide connectivity to one or more networks or computing systems. The processing unit 140 may thus receive information and instructions from other computing systems or services via the network 108. The processing unit 140 may also communicate to and from memory 170 and further provide output information for an optional display 160 via the input/output device interface 155. The input/output device interface 155 may also accept input from the optional input device 165, such as a keyboard, mouse, digital pen, microphone, touch screen, gesture recognition system, voice recognition system, accelerometer, gyroscope, camera, etc.

The memory 170 may contain computer program instructions (grouped as modules in some embodiments) that the processing unit 140 executes in order to implement one or more aspects of the present disclosure. The memory 170 generally includes RAM, ROM and/or other persistent, auxiliary or non-transitory computer-readable media. The memory 170 may store an operating system 174 that provides computer program instructions for use by the processing unit 140 in the general administration and operation of the cue analysis service 120. The memory 170 may further include computer program instructions and other information for implementing aspects of the present disclosure. For example, in one embodiment, the memory 170 includes a user interface module 172 that generates user interfaces (and/or instructions therefor) for display upon a computing device, e.g., via a navigation and/or browsing interface such as a browser or application installed on the computing device. In addition, memory 170 may include or communicate with a probability data repository 134 and/or one or more other data stores, as discussed above with reference to FIG. 1A.

In addition to and/or in combination with the user interface module 172, the memory 170 may include an initial presentation generator 122, a user input module 124 and a dynamic updating module 126 that may be executed by the processing unit 140. In one embodiment, the initial presentation generator 122, user input module 124, dynamic updating module 126, and cue analysis module 176 individually or collectively implement various aspects of the present disclosure, e.g., generating an initial presentation, analyzing user input with respect to the initial presentation, dynamically updating the initial presentation based on the user input, etc., as described further below.

While the initial presentation generator 122, user input module 124, dynamic updating module 126, and cue analysis module 176 are shown in FIG. 1B as part of the cue analysis service 120, in other embodiments, all or a portion of an initial presentation generator, a user input module, a dynamic updating module and/or cue analysis module may be implemented by the retail server 110 and/or another computing device. For example, in certain embodiments of the present disclosure, the retail server 110 may include several modules or components that operate similarly to the modules and components illustrated as part of the cue analysis service 120, including a user interface module, initial presentation generator, user input module, dynamic updating module, cue analysis module, processing unit, computer readable medium drive, etc. In such embodiments, the retail server 110 may communicate with a probability data store, such as probability data repository 134, and the cue analysis service 120 may not be needed in certain embodiments. Further, although certain examples are illustrated herein in the context of a retail server 110, this is not a limitation on the systems and methods described herein. It will also be appreciated that, in some embodiments, a user device may implement functionality that is otherwise described herein as being implemented by the elements and/or modules of the cue analysis service 120. For example, the user computing device 102 may receive code modules or other instructions from the retailer server 110 and/or cue analysis service 120 via the network 108 that are executed by the user computing device 102 to implement various aspects of the present disclosure.

Figure 2:
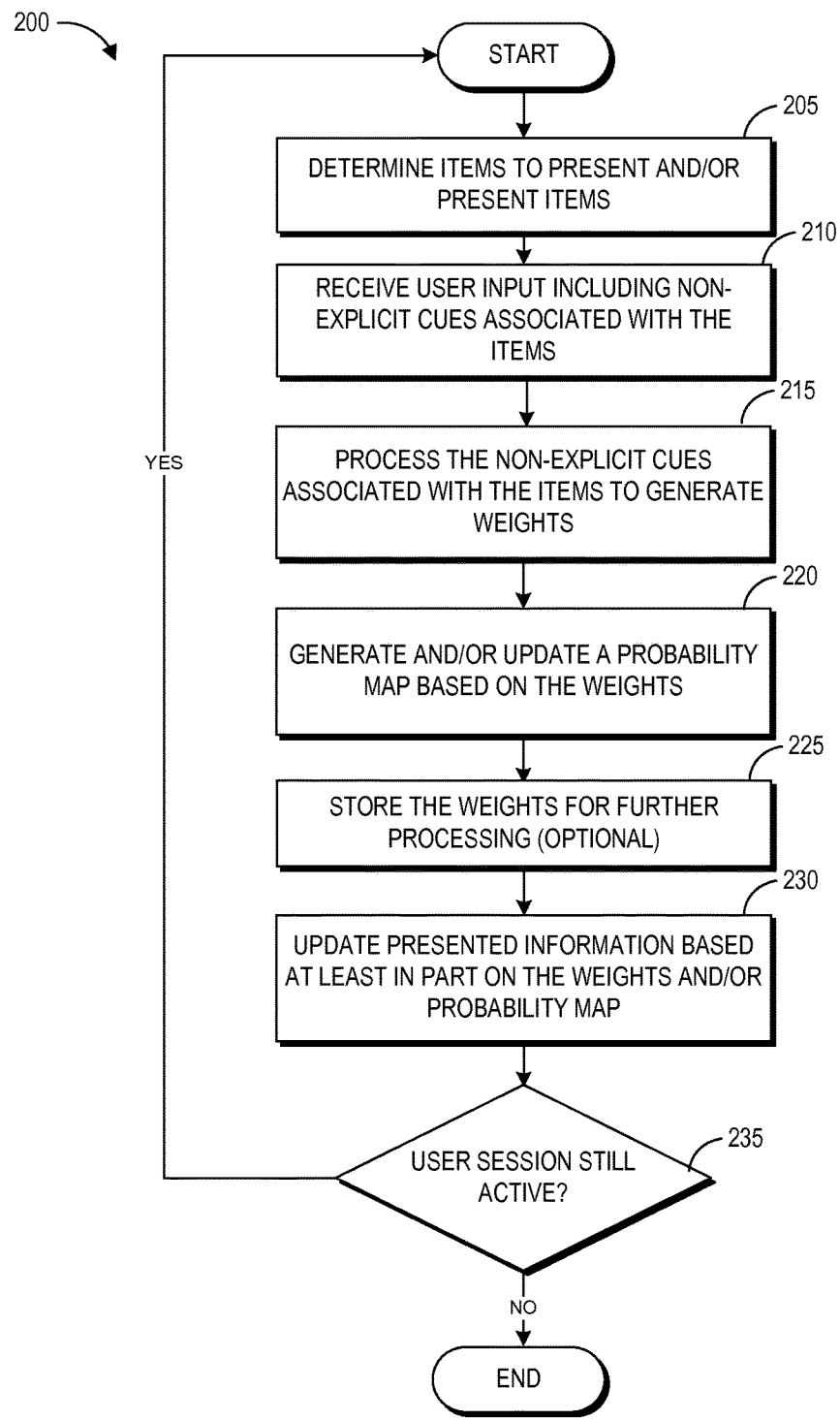
FIG. 2 is a flow diagram of an illustrative method implemented at least in part by a cue analysis service for determining the likelihood of user interest based on non-explicit cues and/or presenting additional information based on non-explicit cues.

FIG. 2 is a flow diagram of an illustrative method 200 implemented at least in part by the cue analysis service 120 for determining the likelihood of user interest in an item based on non-explicit cues and optionally presenting additional information based at least in part on the analysis of non-explicit cues. While the illustrative method will be described below as being implemented by the cue analysis service 120, in other embodiments, a similar method may be implemented by the retail server 110 or other computing system responsible for analyzing non-explicit cues and/or performing some action in response to non-explicit cues. As discussed above, illustrative method 200 may be implemented entirely by a user device, such as user computing device 102, in some embodiments. While a network page, such as a Web page, is used as an example below, the illustrative method 200 may, in other embodiments, include generating and/or updating a user interface and/or displayable file other than a page.

The illustrative method 200 begins at block 205, where the initial presentation generator 122 determines items to be presented, presents the items, and/or generates a presentation configuration including the items. This can occur, for example, when the cue analysis service 120 or another service receives a page request from a user device, such as computing device 102. This can also occur, for example, when the illustrative method 200 has performed a loop and returns to block 205. Alternatively, the cue analysis service 120 or another service may receive a request for a page or part of a page to be generated from the retail server 110. In a retail example, a user may navigate to an item section and/or page associated with a retail store and request to view certain types of items, for example, clothes and/or furniture. As a result, the cue analysis service 120 may receive the request and determine items to be presented based at least in part on the request and/or item information retrieved from the item data repository 112. As one example, the items to be presented may be items responsive to a search query received from the user. As another example, the items may be all items in a category, collection, list or portion of a browse tree. In instances in which block 205 is reached after additional information has been determined for display by the cue analysis service 120, the items to be presented may include the additional information. The initial presentation generator may then present the determined items to the user.

At block 210, the user input module 124 of the cue analysis service 120 receives user input that includes non-explicit cues and/or that may be analyzed to identify non-explicit cues. In some embodiments, user input may include, but is not limited to, mouse movement, page scrolling, voice and/or audio input, camera and/or visual input, accelerometer input, gyroscope input, screen brightness changes, screen magnification, pinching/scrunching, zooming, input wheel rotation, etc. The user input may be associated with and/or in connection to non-explicit cues. For example, the cue analysis service 120 may receive user input data indicating a user request to magnify a portion of the displayed user interface. In the magnification example, the user input data may include enough data to determine the items presented to the user following magnification of a portion of the display. Details regarding input data associated with non-explicit cues that may be received by the cue analysis service 120 are described in further detail below with respect to FIGS. 3A, 4A-C, and/or 5. In some embodiments, the cue analysis service 120 may analyze the received user input to determine non-explicit cues associated with the user input. For example, the cue analysis service 120 may compare user input, such as user navigation of a page, against a predetermined list and/or a collection of interactions that qualify as non-explicit cues. In some embodiments, known interactions and/or patterns of user input, indicating non-explicit cues, may be stored in the probability data repository 134. Thus, user input may be compared against predetermined patterns and/or rules to identify non-explicit cues.

In some embodiments, the user input includes data received from input devices and/or interfaces of the user computing device 102. In the eye tracking example, according to one embodiment, the user input may include video data received from a camera of the user computing device 102 recording one or more user eyes. In other embodiments, the user input may include data that has been processed by one or more modules of the user computing device 102 and/or cue analysis service 120. Accordingly, in another eye tracking example, the user input includes data regarding the results of eye position and/or focus after the eye video data has been processed. Techniques regarding eye tracking and/or processing eye video data is discussed in further detail with reference to FIG. 3A.

At block 215, the cue analysis service 120 may process one or more of the non-explicit cues received at block 210 to generate weights associated with user interface elements. In some embodiments, weights may be distributed evenly among user interface elements and/or items based on the type of user interaction and/or non-explicit cue. For example, where a user navigates to a subset of items of four items and/or magnifies the display to a subset of four items, the cue analysis service 120 may assign probability weights of twenty-five percent to each of the four items. In some embodiments, weights assigned to user interface elements may not correspond to exact probabilities out of one hundred percent. For example, weights may correspond to numerical values, such as five, ten, fifteen points, etc., which are assigned to elements based on the type, severity, and/or duration of the user interaction and/or non-explicit cue. Of course, it will be appreciated that such values may be normalized and/or averaged to correspond to a probability out of one hundred percent or some other total value. In some embodiments, each type of non-explicit cue may be associated with a probability, weighting, and/or programmatic logic to determine a probability and/or weighting based on data associated with the user interaction. For example, in the context of user navigation over a set of items, one non-explicit cue may be a pause of the user navigation, which may indicate a likelihood of user interest. In other words, a user stopping their browsing and/or scrolling may indicate that the user is interested in and/or reviewing items currently presented. In the pausing navigation example, the probability and/or weighting assigned the non-explicit cue may be based on and/or proportional to the pausing time in milliseconds or seconds, for example. Where there are multiple non-explicit cues the cue analysis service 120 may assign weights to user interface elements based on each of the non-explicit cues and/or based on a combination of the non-explicit cues.

In some embodiments, the cue analysis service 120 may adapt, refine, and/or improve the weights associated with user interactions and/or non-explicit cues. For example, the weights, weighting model, and/or weighting mechanism may be based on user feedback associated with a large number of interactions and/or interactions of multiple users over time. Weighting models that accurately predict user behavior may be reinforced by positively increasing the values and/or weights of those models. The accuracy of weighting models may be defined and/or determined by one or more measures of success. Non-limiting examples of measures of success for predicting user interest may include how often a user selects an item following a positive weighting of that item, how often users purchase positively weighted items, and/or various user engagement indicators (such as how long a user stays on a page and/or views an item). Positive examples of user engagement may further include the average length a user views an item and/or collection of items. For example, a user viewing ten items within ten minutes may indicate greater user interest in those items than a user viewing twenty items within ten minutes. One or more techniques such as machine learning, artificial intelligence and/or neural networks may be used alone or in combination to reinforce, improve, and/or adapt the weightings over time. In some embodiments, the non-explicit cues may be used as metadata for improving the weighting models associated with the user interactions. For example, the total number of user interactions (including non-explicit cues) may be used as an indicator for positive and/or negative weighting of prediction models.

At block 220, the cue analysis service 120 may generate and/or update a probability map based on the assigned weights of the elements that were previously determined based on the non-explicit cues. As will be described in further detail with reference to FIG. 6A-B, the cue analysis service 120 may generate a probability and/or weighting map corresponding to each element and/or item of the user interface. The probability map may be updated by the cue analysis service 120 over time as user interactions are processed by the cue analysis service 120, as will be described below with references to FIGS. 4A-C and 6. For example, after a user scrolls to three items, each item may receive a weighting of five points. The probability map may then be updated by incrementing and/or decrementing weights associated with the items and/or elements, for example, by adding five points to each of the three items.

At block 225, the cue analysis service 120 may optionally store the weights and/or the probability map for further processing. For example, as described above, the weightings and/or probability maps may be used to improve the weightings models. The weightings and/or probability maps may be stored and/or retrieved from the probability data repository by the cue analysis service 120 to improve and/or refine the weighting models. In some embodiments, probability maps may be stored in association with the particular user to improve the user experience for that user. Furthermore, the cue analysis service 120 may learn user behavior over time and/or customize non-explicit cue determination by user. For example, a particular user may have a habit of selecting text and/or moving a cursor in a circular or random pattern over an item and/or item image when that user is interested in a particular item. By storing the weights and/or user behavior with respect to non-explicit cues, the cue analysis service 120 may further analyze that behavior following the end of a user session. For example, browsing and/or purchase behavior of the user after the non-explicit cues were received may be used to determine appropriate weights to apply to future non-explicit cues of certain types with respect to a specific user or multiple users sharing common characteristics, demographics, attributes or behaviors.

At block 230, the dynamic updating module of the cue analysis service 120 updates and/or provides instructions to update the presented information based at least in part on the weights and/or probability map. For example, if the determined weighting for an element exceeds a weighting threshold, then the cue analysis service 120 may present additional and/or subsequent information to the user. As will be described below with reference to FIG. 3B, one example of additional information presented to the user based on non-explicit cues includes a pop-up element that displays additional images, item descriptions, item ratings, and/or other data associated with the item in which a user may be interested. Additional information may also include video animations such as showing additional views of an item (e.g., a three hundred sixty degree fly around), a model using and/or wearing the item, and/or additional images or videos associated with similar and/or related items.

In some embodiments, additional information presented at block 230 may include additionally presented elements to teach and/or inform the user about the user interface or specific elements of the user interface. For example, a user interface element may be highlighted and/or emphasized to illustrate a user interface feature for which a user may have some unfamiliarity. The potential unfamiliarity may be determined, for example, based at least in part on the determined weights for one or more elements suggesting that the user has focused on those elements but not yet taken any explicit action. In some embodiments, if there are multiple items of interest to the user with equal associated weights, then the cue analysis service 120 may select one item at random for additional presentation of information and/or some other logic may be used, such as showing additional information for more than one of the multiple items of interest. In some embodiments, additional information displayed in response to detection of non-explicit cues for an element may be presented on a separate page and/or user interface than the corresponding element. It will be appreciated that instead of subsequent presentation of additional information to the user, in some embodiments, some other action may be triggered in response to the identification of non-explicit cues and/or based on entries in a generated probability map. For example, the probability map based on non-explicit cues may be used to generate an internal analytics report regarding user interest in a network page or elements thereof.

At decision block 235, the user input module 124 of the cue analysis service 120 determines whether the user session is still active. If the user session is still active, the illustrative method 200 can loop back to block 205 to determine items, present items, and/or process other blocks of method 200 including processing additional user input and/or non-explicit cues. The cue analysis service 120 may determine that the user session is still active if additional user input has been received and/or user input terminating the session, such as closing a page, has not been received. Thus, illustrative method 200 may end if the user session is no longer active.

While FIG. 2 has been described above with reference to an embodiment in which non-explicit cues are received and/or analyzed by the cue analysis service 120, in other embodiments, all or a portion of the non-explicit cue processing may be performed by the computing device 102. For example, executable code included in a page or associated with a user interface may, when executed by the computing device 102, cause the computing device 102 to generate and/or update additional display of information. As an example, a script or other executable code may be included in a page sent by the retail server 110 and/or cue analysis service 120 to the computing device 102 for display by a browser or other application executed by the computing device 102. Upon receiving user input regarding a page, the script or other executable code may cause the computing device 102 to generate additional display(s) of information based on the non-explicit cues, as described herein, which may include sending requests for additional information to the retail server 110 or other computing system.

Figure 3A:
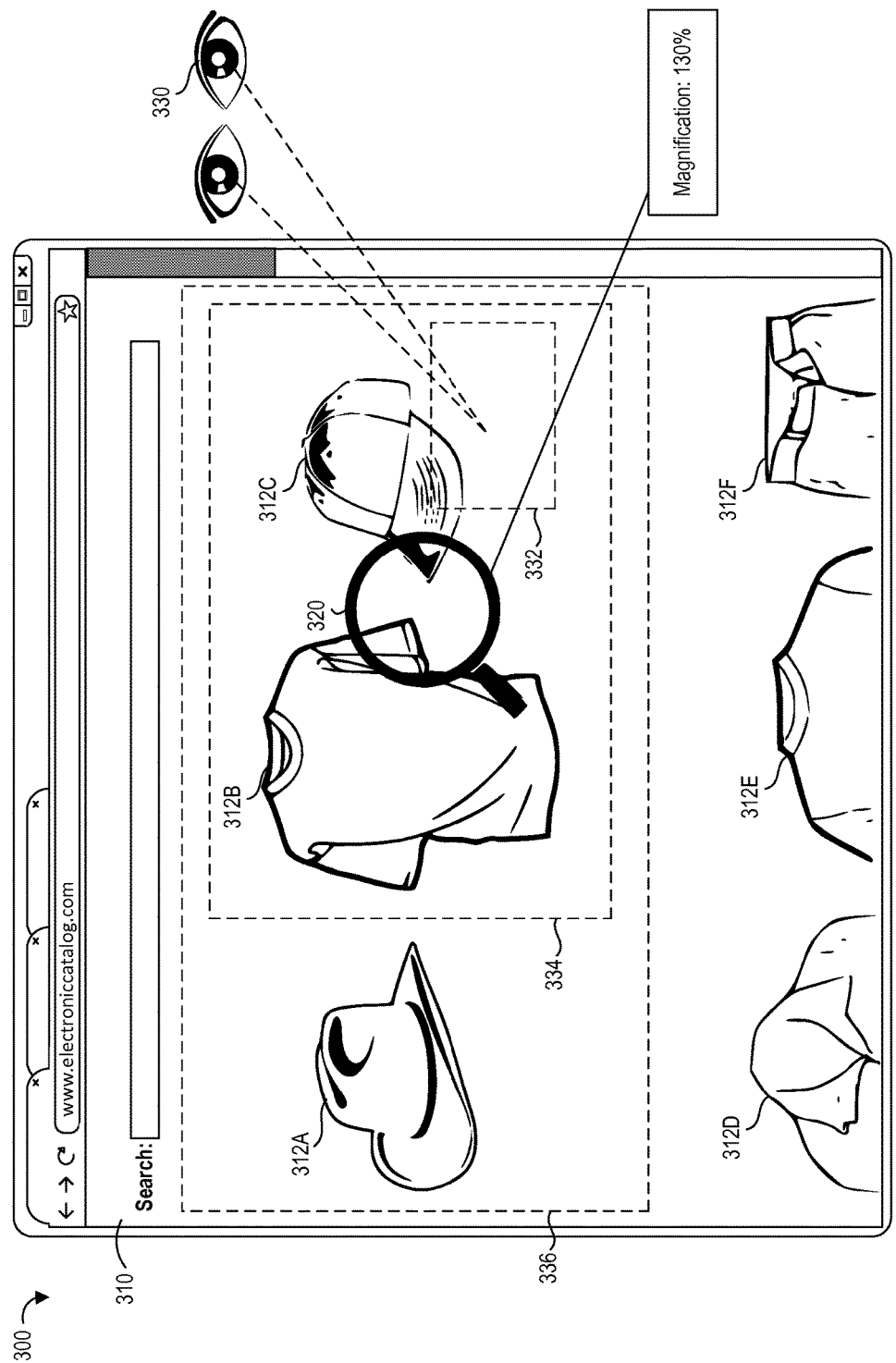
FIG. 3A is an illustrative user interface with which a user may interact to provide non-explicit cues that may be received by a cue analysis service.

FIG. 3A is an illustrative user interface 300, generated at least in part by the initial presentation generator 122, that includes an item display area 310. A user interface similar to user interface 300 may be presented in a variety of circumstances, such as when presenting search results to a user or when enabling a user to browse a category of items. The item display area 310 may display items and/or item images, here items 312A-F. The items displayed in the display area 310 may include item images, item descriptions, item names, item prices, item ratings, and/or any other metadata associated with the items. As will be described below, the cue analysis service 120 may analyze the non-explicit cues generated from a user interacting with the example user interface 300.

Figure 3B:
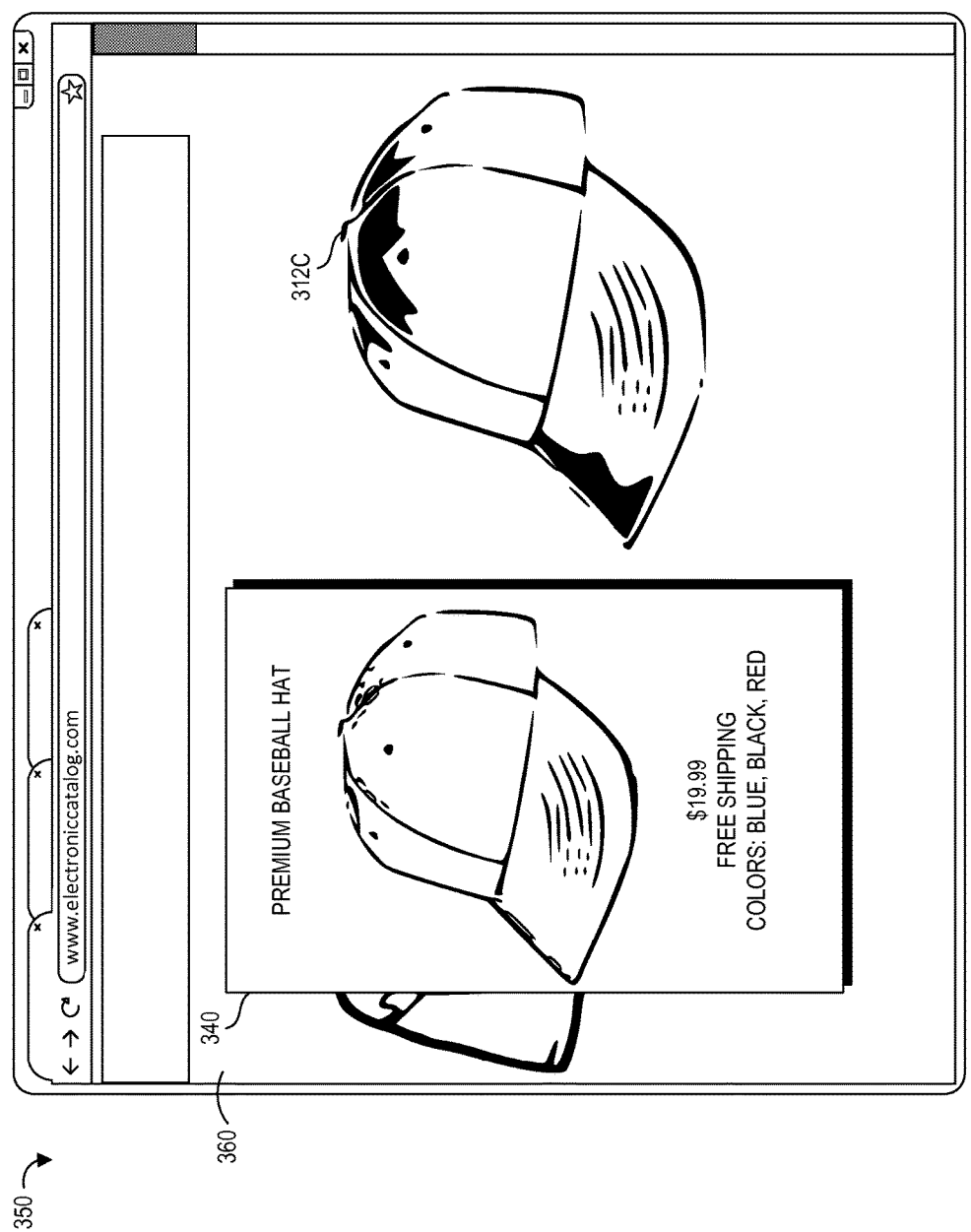
FIG. 3B is another illustrative user interface generated at least in part by a cue analysis service that includes the presentation of additional information based at least in part on the non-explicit cues.

As illustrated, a user may interact with user interface 300 through magnification control 320 of the screen, page, and/or display. The illustrated magnification control 320 may represent any mechanism for magnifying part of the display of a browser page, user interface of an application installed on the computing device and/or other interface. For example, many network browsers include functionality to maximize and/or minimize a page based on user input, such as a user selecting "control" and "plus" on a keyboard one or more times. FIG. 3B may illustrate the user interface 300 following magnification. A request for magnification may be considered a non-explicit cue, according to some embodiments. For example, a magnification request by a user may indicate that the user is interested in the items within the requested magnification area because the user may desire to see the items in a larger view. As described herein, the items appearing near or within the magnification control and/or within a determined magnification area may receive weights and/or points indicating user interest that may trigger further display of information.

In addition, the cue analysis service 120 may receive visual input in the form of eye position and/or eye movement tracking 330. It will be appreciated that different techniques may be used alone or in combination to perform eye tracking and/or detect eye movement such as measuring eye positions, using video-based eye trackers (where a camera focuses on one or both eyes and records their movement as the viewer looks at the screen, page, and/or display), and/or measuring fixations and saccades of the eye in a scan path. In some embodiments, visual input may be received as non-explicit cues to assign weights and/or points. For example, the items within the display area associated with the visual input may receive weights and/or points allocated in a heat map. The detected visual input may be directed towards a first area 332, which may be the focus of the detected visual input. Items within the first area 332 may receive the highest points based on the visual non-explicit cue, for example, fifteen points. As a heat map, items within one or more areas adjacent to the first area 332 may receive descending weights and/or points based on the relative distance from the first area 332. For example, items within areas 334 and 336 may receive ten and five points, respectively, based on the relative distance from the first area 332. It will be appreciated that other heat map patterns than that illustrated in FIG. 3A may be used with reference to eye tracking data and/or assigning weights to user interface elements. The assignment and/or determination of weights and/or points may correspond to the illustrative method 200 of FIG. 2.

According to some embodiments, two or more non-explicit cues associated with the same item and/or element may indicate a much higher probability that the user is interested in that particular item and/or element. For example, as illustrated, item 312C is associated with the non-explicit cue of magnification (represented by magnification user input 320) and a non-explicit cue of eye detection (represented by eye input 330 and/or the first area 332). Thus, item 312C may be the item with the highest score, total weight, and/or probability weights based on the two or more non-explicit cues. In some embodiments, the various points or weights for an item due to the collective non-explicit cues detected may be combined in a variety of ways. For example, in one embodiment, points or weights due to each non-explicit cue may be simply added to a running total weight for a given item or element, which may later be normalized or otherwise adjusted for comparison to other items' weights. In other embodiments, a rule set may be applied that combines points in non-linear manners and/or based on collective user interactions according to various rules stored in probability data repository 134. For example, according to a sample rule set of one embodiment, a specific eye input and specific scroll input may have relatively small effects on an element's weight individually, but may have a relatively large effect on the element's weight when occurring in combination.

FIG. 3B is another illustrative user interface 350 generated at least in part by the cue analysis service 120 that includes an item display area 360. As illustrated, user interface 350 includes many elements similar to user interface 300 discussed above. The item display area 360 may be a magnified version of the item display area 310 of FIG. 3A. As described above, the cue analysis service 120 may determine that item 312C has the highest likely user interest level based on its cumulative probability weight and/or value based on analysis of one or more non-explicit cues. As such, the cue analysis service 120 may determine that additional display area 340, which includes additional information regarding item 312C, should be presented to the user. As illustrated, additional display area 340 may include another view and/or image of item 312C and/or additional data or item attributes associated with item 312C, such as price, additional colors in the user's size, shipping options, descriptions, user ratings, and/or other information. The additional display area 340 may be superimposed over and/or be a pop-up interface element over display area 360. Furthermore, additional display area 340 may be generated according to illustrative method 200 of FIG. 2. Thus, in response to the determined non-explicit cues, the cue analysis service 120 may present additional information to the user based on minimal interaction with the user interface 300 and/or 350 of FIGS. 3A and/or 3B, respectively. In some embodiments, the display of additional information 340 may include item recommendations. For example, since the determined item of interest 312C is a hat, a display of additional information similar to additional information 340 may include a recommendation for a matching shirt and/or jeans (not illustrated). In some embodiments, item recommendations may be based on purchase history data. For example, items that are frequently purchased together and/or popular items may be provided as recommendations based on non-explicit cues for related items.

Figure 4A:
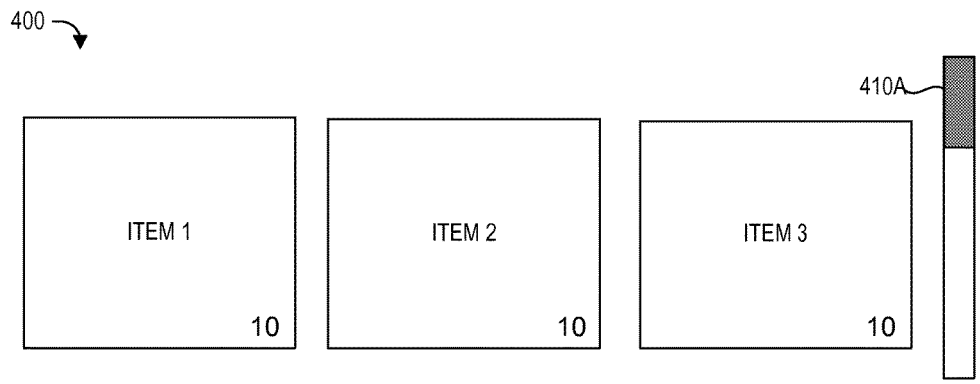
FIGS. 4A-C illustrate an example sequence of partial user interface representations illustrating the determination of an item interest based on user interactions while browsing the items, according to some embodiments.
Figure 4B:
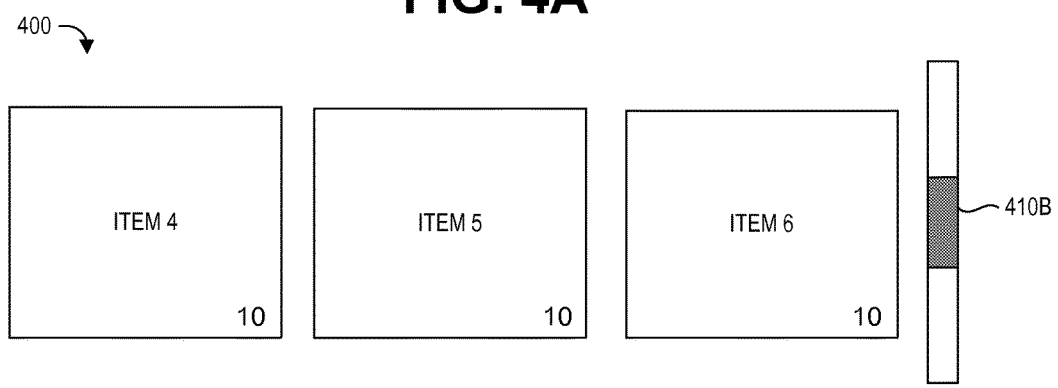
Figure 4C:
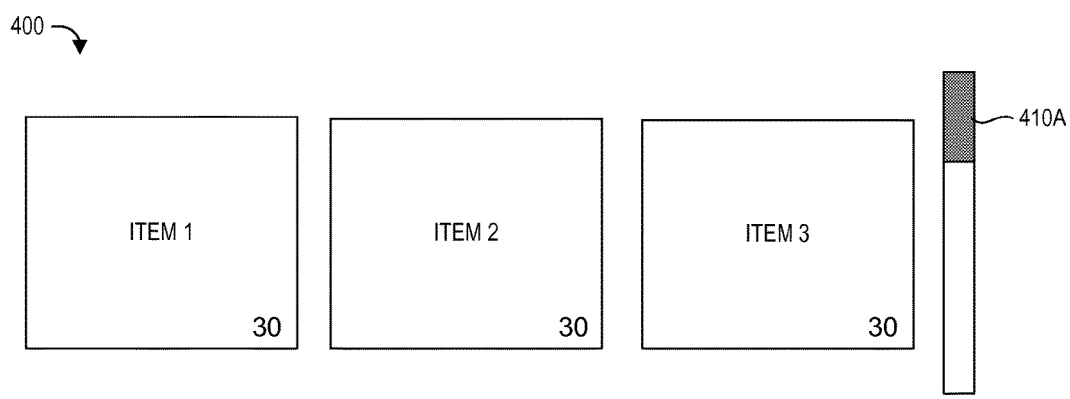

FIGS. 4A-C illustrate an example of a sequence of partial user interface representations illustrating scrolling based on user interaction with an interactive item display area 400. FIGS. 4A-C will be described with reference to one sample embodiment, with potential point amounts and/or values provided for illustrative purposes only. The interactive item display area 400 illustrated in FIG. 4A includes multiple items and a scroll interface element. Since items one, two, and three are within the current display area, each of the items may receive ten points indicating likely user interest. The assignment and/or determination of weights and/or points may correspond to the illustrative method 200 of FIG. 2. As illustrated, the scroll elevator element may be in a first position 410A associated with the currently displayed items one, two, and three. In some embodiments, items displayed for a first time may receive a default value of zero.

As illustrated in FIG. 4B, user input may be detected with respect to interactive item display area 400. For example, a user may have selected the scroll elevator element from the first position 410A of FIG. 4A to a second position 410B of FIG. 4B. Thus, the interactive item display area 400 of FIG. 4B may update to present items four, five, and six, which were not previously displayed. As such, as described herein, items four, five, and six may be assigned ten points each because the user may have navigated to those items, which may indicate potential interest.

As illustrated in FIG. 4C, further user input may be detected with respect to interactive item display area 400 to determine non-explicit cues. For example, a user may have selected the scroll elevator element from the second position 410B of FIG. 4B back to the first position 410A of FIG. 4C. The interactive item display area 400 of FIG. 4C may update to present items one, two, and three, which were previously displayed in of FIG. 4A. FIGS. 4A-C illustrate a sequence of user interactions where a user has scrolled and/or navigated away from items one, two, and three, and then scrolled and/or navigated back to items one, two, and three. Therefore, the one or more navigation interactions of the user may be interpreted by the cue analysis service 120 as one or more non-explicit cues of user interest. In the example, items one, two, and three receive twenty points each, which is higher than the previously assigned points of FIG. 4A, for respective totals of thirty points each. Thus, the scrolling interactions of a user that focused on items one, two, and three, are reflected in the points and/or scores of items one, two, and three that are higher than the points and/or scores of items four, five, and six. In some embodiments, a rule set may have been applied that assigned points based on the collective interactions illustrated in FIGS. 4A-C, such that the specific series of scroll actions is considered a single non-explicit cue. In other embodiments, each user input interaction may be analyzed as an independent non-explicit cue and/or assigned points in an independent and/or discrete manner. For example, each navigation interaction in FIGS. 4A, 4B, and 4C, respectively, may receive ten points each (in contrast to what is illustrated in FIG. 4C). The scrolling interaction and/or navigation illustrated in FIGS. 4A-C may be a strong non-explicit cue because the interaction represents a user performing one action (navigating away from items one, two and three) and then undoing the action (navigating back to items one, two and three). In some embodiments, other user interactions than those illustrated in FIGS. 4A-C may be received by the cue analysis service 120 to determine non-explicit cues. For example, an analogous paging and/or navigation user interaction of navigating away from items and/or returning back to them, similar to what is illustrated in FIGS. 4A-C, may be received by the cue analysis service 120 to determine user interest. It will be appreciated that other non-explicit cues may be combined with the non-explicit cue illustrated in FIGS. 4A-C, such as eye detection and/or other input.

Figure 5:
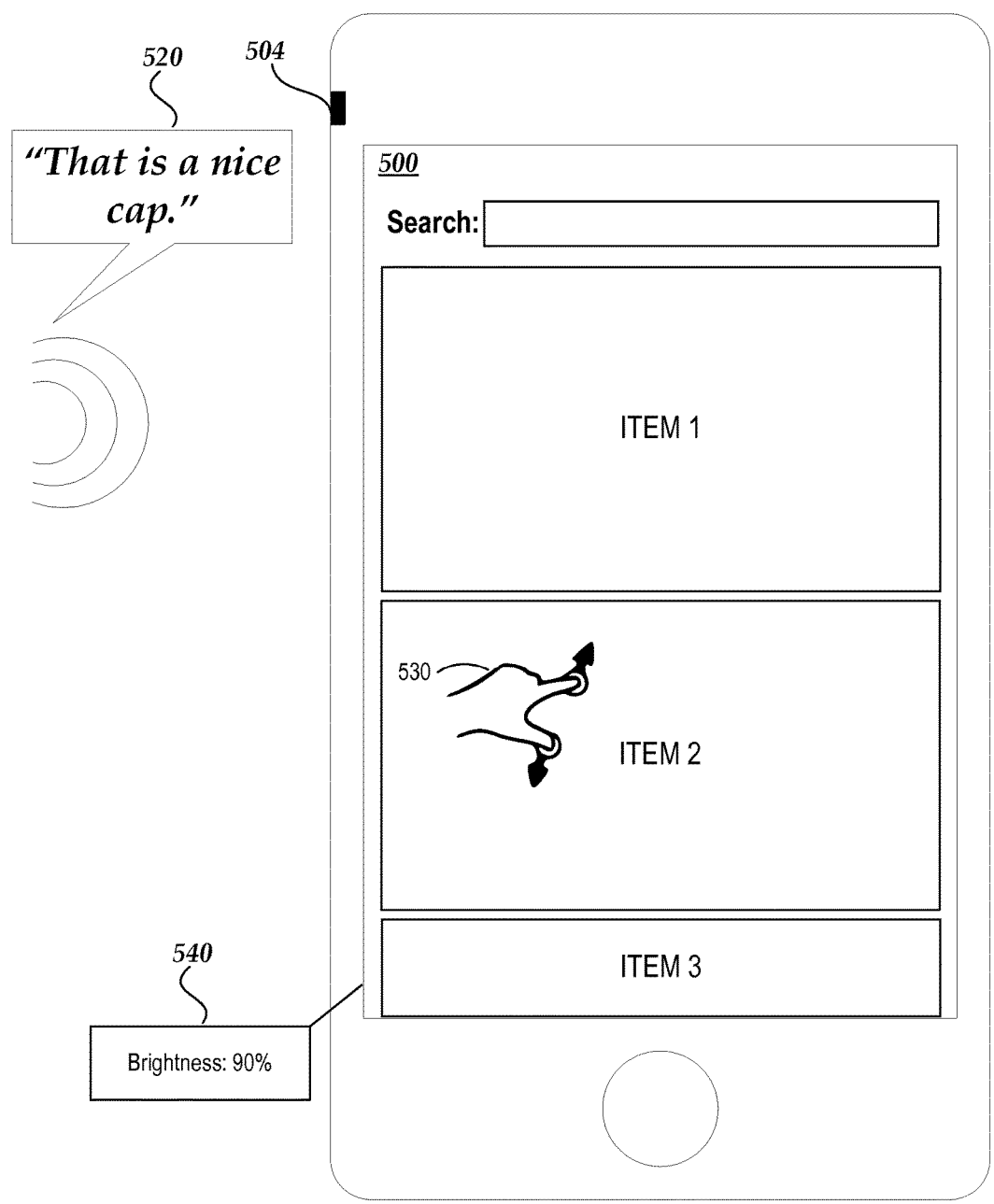
FIG. 5 is another illustrative user interface with which a user may interact to provide non-explicit cues that may be received by a cue analysis service.

FIG. 5 is another illustrative user interface with which a user may interact to provide non-explicit cues that may be received by a cue analysis service 120. As illustrated, the user interface 500 may be displayed on user computing device 102. The user interface may be generated at least in part by the user computing device 102 and/or the cue analysis service 120, depending on the embodiment. As illustrated, user computing device 102 may present items one, two, and three, and/or the cue analysis service 120 may receive one or more user inputs to determine non-explicit cues. For example, the cue analysis service 120 may receive a zoom interaction 530. The zoom interaction 530 may be similar to the magnification action 320 of FIG. 3A. For example, a zoom interaction may expand a portion of the display area of the user computing device 102 such that a user may view one or more items at a higher magnification and/or larger view. Additionally and/or alternatively, a user may scroll and/or browse through the items. As a result, the determination of non-explicit cues and/or assignment of weights may correspond to the descriptions herein with reference to FIGS. 2, 3A-B, and/or FIG. 4-C. In some embodiments, a pinch, zoom, and/or navigation interaction may occur by a tap and hold, swipe, one or more mouse clicks, single touch gesture, multitouch gesture, or the like. An input instrument for the user interactions can be a finger, stylus, or combination of fingers for a multitouch gesture, in some embodiments. An indication of the user input can be detected or received by the user input module 124. Though discussed as implemented in a device equipped with touch-sensitive technology, other embodiments can be implemented in systems responding to other types of user input such as mouse clicks, key presses, input wheel rotation, etc.

Additionally or alternatively, the cue analysis service 120 may receive other user input with respect to user interface 500. A user may increase and/or decrease screen brightness 540 of the user computing device 102, which may be considered a non-explicit cue. For example, the on-screen visibility of items on a user computing device may be impaired by the environmental conditions in which the user computing device is used, e.g., a smartphone being used outdoors in the sunlight. As a result, a user may increase screen brightness to better view a presentation of items, which may be considered a non-explicit cue of user interest. Another type of user input that may be considered to be a non-explicit cue is audio input. For example, audio input 520, which corresponds to the phrase "that is a nice cap," may be received by an audio microphone and/or other input device that is part of, or in communication with, the user computing device 102. The audio input 520 may be considered a non-explicit cue because the audio input may not specifically refer to a particular item. For example, items one, two and/or three may include two or more caps and/or hats. Additionally or alternatively, audio input 520 may be a non-explicit cue because the audio input may not be a direct voice command (e.g., audio input from a conversation or from a user talking to himself or herself).

In some embodiments, accelerometer and/or gyroscopic input data (not illustrated in FIG. 5) may be detected by the user computing device 102 and/or received by the cue analysis service 120 to determine non-explicit cues. For example, some user computing devices may be placed and/or orientated with the display facing down. During meetings and/or events where users do not want to be distracted, some user behavior includes placing their computing devices and/or smartphones in a downward orientation to obscure view of the display screen. As a result, such a motion may be a non-explicit cue of decreased user interest with respect to one or more items. Conversely, user interaction changing the orientation of the user computing device, waking up from a sleep mode, and/or unlocking the user computing device to view the display may indicate positive user interest with respect to one or more items. Other user interactions that may be detected via accelerometer and/or gyroscopic input may include a user interaction to elevate, hold up, and/or move the user computing device. For example, a user in a physical retail store may compare one or more physical items with the items displayed on their user computing device, which is another indicator of likely user interest with respect to the one or more items. Another example may include one user giving the user computing device to another user to view. As described herein, one or more non-explicit cues with respect to user interface 500 and/or the user computing device 102 may be analyzed in combination, e.g., two or more cues being a strong indicator for user interest.

FIGS. 6A-B illustrate an example probability and/or weighting map of elements based on the analysis of non-explicit cues. The illustrated probability map 602A may generally be considered an illustrative graphical representation of data that may be stored in the probability data repository based on non-explicit cue analysis by the cue analysis service 120. The probability map 602A may include entries for one or more elements and/or items included in one or more interfaces, pages or other sources. Each element may be stored with an associated weight, total weight, weighting, point, and/or value indicating likely user interest in the respective element. In the illustrated example, element one is associated with five points and element twenty-five is associated with zero points. The probability map 602A may be associated with a particular time, e.g., after one or more user interactions have been analyzed for non-explicit cues. The probability map 602A may be generated from the illustrative method 200 of FIG. 2 and/or based at least in part on similar user interactions to those illustrated in FIGS. 3A-B, 4A-C, and/or FIG. 5. In some embodiments, the probability map 602A may be stored in one or more data formats, such as, but not limited to, Extensible Markup Language ("XML"), JavaScript Object Notation ("JSON"), in-memory data objects and/or collection objects, records in a data store, and/or some other format. As described above, the probability map may be stored in the probability data repository 134 and/or may be stored for one or more particular users.

As illustrated in FIG. 6B, cue environment 610 may include probability map 602B. The probability map 602B may be similar to probability map 602A of FIG. 6A. However, the probability map 602B may correspond to a different point in time than the time associated with probability map 602A of FIG. 6A. For example, probability map 602B may be updated after probability map 602A was generated. As described above with reference to illustrative method FIG. 2, following subsequent user interactions and/or analysis for non-explicit cues, the probability map may be updated. Thus, probability map 602B may be an updated version of 602A after one or more non-explicit cues have been recognized and/or analyzed by the cue analysis service 120. For example, elements one, two, three, four, five, six, seven, eight and nine may have been updated in probability map 602B following detection of eye input similar to that illustrated in FIG. 3A. As illustrated, elements one, two, three, four, five, six, seven, eight and nine are allocated points in a heat map pattern. Element three is the focal point and has the highest value (thirty points) out of the heat map. Adjacent to element three are elements two, five, and six, which have less points than element three (fifteen points each). Adjacent to elements two, five, and six are elements one, four, seven, eight, and nine, which have the lowest points out of the heat map (ten points each). The bottom row including elements thirty-seven, forty-four, and forty-five may have weights and/or values corresponding to scrolling and/or browsing input where a user has browsed away from a row of items and then returned to those same items. As described above, the probability map may be used to generate additional display of information for those elements having values above a particular threshold and/or based on some other logic.

Although the images and representations described herein are generally discussed in the context of a two-dimensional graphics and/or images, it will be appreciated that the determination of non-explicit cues and/or display of additional information may be accomplished within a three-dimensional visual space as well. For example, some systems may display three-dimensional representations of items or other objects to users on a two-dimensional display. Other systems may display three-dimensional representations of objects using a volumetric display, for example, a stereoscopic, autostereoscopic, or multiscopic display. The data units of the three-dimensional images can be represented by one or more of voxels, polygons, or points within a point-cloud.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for detecting non-explicit cues, the system comprising:
    an electronic data store configured to store at least a plurality of items; and
    a computing system comprising one or more hardware computing devices executing specific computer-executable instructions, said computing system in communication with the electronic data store, and configured to at least:
        retrieve, from the electronic data store, the plurality of items for presentation;
        generate a presentation configuration comprising the plurality of items;
        generate weighting data comprising a value for each item of the plurality of items;
        initialize, in the weighting data, at least a first initial value for a first item of the plurality of items and a second initial value for a second item of the plurality of items;
        detect an indication of first user input with respect to the presentation configuration, wherein the first user input corresponds to a first non-explicit cue that is not directed exclusively to any single item;

in response to the detected indication of the first user input, analyze the first non-explicit cue to determine that the first non-explicit cue is directed towards a first area of the presentation configuration;

determine that the first and second items are within the first area;

determine a first weight associated with at least the first area;

update, in the weighting data, the first initial value to reflect the first weight, which results in a first updated value, and the second initial value to reflect the first weight, which results in a second updated value;

detect an indication of second user input with respect to the presentation configuration, wherein the second user input corresponds to a second non-explicit cue that is not directed exclusively to any single item;

in response to the detected indication of the second user input, analyze the second non-explicit cue to determine a second weight associated with at least the first item, wherein the second weight is different than the first weight based at least in part on a difference between respective types of the first and second non-explicit cues;

update, in the weighting data, the first updated value to reflect the second weight, which results in a third updated value; and update the presentation configuration to display additional information associated with the first item based at least in part on a determination that the third updated value associated with the first item exceeds a threshold and that the second updated value associated with the second item does not exceed the threshold.

2. The system of claim 1, wherein each of the first user input and the second user input comprise at least one of eye tracking data, navigation data, display magnification data, pinch interaction data, zoom interaction data, audio input, accelerometer input, gyroscope input, or display brightness data.

3. The system of claim 1, wherein updating the presentation configuration to display additional information comprises display of an item recommendation associated with the first item.

4. The system of claim 1, wherein analyzing the second non-explicit cue further comprises:

determining that the second user input is associated with a user navigation, with respect to the presentation configuration, away from the first item and another item and navigation returning to the first item and another item.

5. A system comprising:

an electronic data store configured to store at least a plurality of elements; and a computing system comprising one or more hardware computing devices executing specific computer-executable instructions, said computing system in communication with the electronic data store, and configured to at least:

generate a presentation configuration comprising a subset of the plurality of elements;

generate weighting data comprising a value for each element of the subset of the plurality of elements;

initialize, in the weighting data, at least a first initial value for a first element of the plurality of elements and a second initial value for a second element of the plurality of elements;

detect an indication of first user input with respect to the presentation configuration, wherein the first user input relates to a first non-explicit cue, and wherein the first non-explicit cue corresponds to at least one of: the presentation configuration as a whole, or two or more of the plurality of elements;

in response to the detected indication of the first user input, analyze the first user input to determine that the first non-explicit cue is directed towards a first area of the presentation configuration;

determine that the first and second elements are within the first area;

determine a first weight associated with at least the first area;

update, in the weighting data, the first initial value to reflect the first weight, which results in a first updated value, and the second initial value to reflect the first weight, which results in a second updated value;

detect an indication of second user input with respect to the presentation configuration, wherein the second user input relates to a second non-explicit cue;

in response to the detected indication of the second user input, determine a second weight associated with at least the first element, the second weight different than the first weight based at least in part on a difference between respective types of the first and second non-explicit cues;

update, in the weighting data, the first updated value to reflect the second weight, which results in a third updated value; and update the presentation configuration to display additional information associated with the first element based at least in part on a determination that the third updated value exceeds a threshold and that the second updated value associated with the second element does not exceed the threshold.

6. The system of claim 5, wherein analyzing the first non-explicit cue further comprises:

determining that the first user input is associated with a user navigation, with respect to the presentation configuration, away from the first element and another element and navigation returning to the first element and another element.

7. The system of claim 5, wherein each of the first user input and the second user input comprise at least one of eye tracking data, navigation data, display magnification data, pinch interaction data, zoom interaction data, audio input, accelerometer input, gyroscope input, or display brightness data.

8. The system of claim 5, wherein updating, in the weighting data, the first updated value further comprises adding the second weight.

9. The system of claim 5, wherein the computing system is further configured to at least:

determine that the first non-explicit cue and the second non-explicit cue correspond to a predetermined collection of user interactions, wherein a difference in value between the third updated value and the first updated value is greater than the first weight and the second weight combined;

detect an indication of third user input with respect to the presentation configuration, wherein the third user input relates to a third non-explicit cue; and determine, from the third user input, a fourth value associated with at least a third element of the plurality of elements, wherein the fourth value exceeds the threshold, and wherein updating the presentation configuration is further based at least in part on a determination that the third updated value is higher than the fourth value.

10. A computer-implemented method comprising:
as implemented by one or more computing devices configured with specific executable instructions,
retrieving a plurality of elements for presentation;
generating a presentation configuration comprising the plurality of elements;
generating weighting data comprising a value for each element of the plurality of elements;
initializing, in the weighting data, at least a first initial value for a first element of the plurality of elements and a second initial value for a second element of the plurality of elements;
detecting an indication of first user input with respect to the presentation configuration, wherein the first user input relates to a first non-explicit cue, and wherein the first non-explicit cue corresponds to two or more of the plurality of elements;
in response to the detected indication of the first user input, analyzing the first user input to determine that the first non-explicit cue is directed towards a first area of the presentation configuration;
determining that the first and second elements are within the first area;
determining a first weight associated with at least the first area;
updating, in the weighting data, the first initial value to reflect the first weight, which results in a first updated value, and the second initial value to reflect the first weight, which results in a second updated value;
detecting an indication of second user input with respect to the presentation configuration, wherein the second user input relates to a second non-explicit cue;
in response to the detected indication of the second user input,
determining a second weight associated with at least the first element, the second weight different than the first weight based at least in part on a difference between respective types of the first and second non-explicit cues;
updating, in the weighting data, the first updated value to reflect the second weight, which results in a third updated value; and
updating the presentation configuration to display additional information based at least in part on a determination that the third updated value exceeds a threshold and that the second updated value associated with the second element does not exceed the threshold.

11. The computer-implemented method of claim 10, analyzing the first user input further comprises:
determining that the first user input is associated with a user navigation, with respect to the presentation configuration, away from the first element and another element and navigation returning to the first element and another element.

12. The computer-implemented method of claim 10, wherein the first user input comprises at least one of eye tracking data, navigation data, display magnification data, pinch interaction data, zoom interaction data, audio input, accelerometer input, gyroscope input, or display brightness data.

13. The computer-implemented method of claim 10, wherein the second user input comprises at least one of a scroll request or a zoom request.

14. The computer-implemented method of claim 10, wherein updating the presentation configuration to display additional information comprises display of a superimposed element.

15. The computer-implemented method of claim 10, wherein updating the presentation configuration to display additional information comprises display of a teaching user interface element that instructs a user how to use one or more elements within the presentation configuration.

16. The computer-implemented method of claim 10, wherein the first user input comprises eye tracking data, and wherein weights associated with elements are assigned based at least in part on a heat map determined from the eye tracking data.

17. The computer-implemented method of claim 10, wherein updating the presentation configuration to display additional information comprises display of an animation.

18. A computer-readable, non-transitory storage medium storing computer executable instructions that, when executed by one or more computing devices, configure the one or more computing devices to perform operations comprising:
causing presentation of a user interface comprising a plurality of elements;
generating weighting data comprising a value for each element of the plurality of elements;
initializing, in the weighting data, at least a first initial value for a first element of the plurality of elements and a second initial value for a second element of the plurality of elements;
detecting an indication of first user input of a first type, wherein the first user input relates to a first non-explicit cue, and wherein the first non-explicit cue corresponds to two or more of the plurality of elements;
determining that the first non-explicit cue is directed towards a first area of the user interface;
determining that the first and second elements are within the first area;
determining a first weight associated with at least the first area;
updating, in the weighting data, the first initial value to reflect the first weight, which results in a first updated value, and the second initial value to reflect the first weight, which results in a second updated value;
detecting an indication of second user input of a type other than the first type, wherein the second user input relates to a second non-explicit cue, and wherein the second non-explicit cue corresponds to two or more of the plurality of elements;
determining a second weight associated with at least the first element, the second weight different than the first weight based at least in part on a difference between respective types of the first and second non-explicit cues;
updating, in the weighting data, the first updated value to reflect the second weight, which results in a third updated value;
and
updating the presentation of the user interface to display additional information associated with the first element based at least in part on a determination that the third updated value exceeds a threshold and that the second updated value associated with the second element does not exceed the threshold.

19. The computer-readable, non-transitory storage medium of claim 18, wherein the first user input comprises at least one of eye tracking data or navigation data, and the second user input comprises at least one of display magnification data, pinch interaction data, zoom interaction data, audio input, accelerometer input, gyroscope input, or display brightness data.

20. The computer-readable, non-transitory storage medium of claim 18, wherein updating, in the weighting data, the first updated value further comprises adding the second weight.

21. The computer-readable, non-transitory storage medium of claim 18, wherein the operations further comprise:
- determining that the first non-explicit cue and the second non-explicit cue correspond to a predetermined collection of user interactions, wherein a difference in value between the third updated value and the first updated value is greater than the first weight and the second weight combined;
- detecting an indication of third user input, wherein the third user input relates to a third non-explicit cue; and
- determining, from the third user input, a fourth value associated with at least a third element of the plurality of elements, wherein the fourth value exceeds the threshold, and wherein updating the presentation of the user interface is further based at least in part on a determination that the third updated value is higher than the fourth value.

\* \* \* \* \*